US005152312A

United States Patent [19]

Kogel

[11] Patent Number: 5,152,312

[45] Date of Patent: Oct. 6, 1992

[54] AUTOMATIC SHUTTLE VALVE

[75] Inventor: Karl Kogel, Erlangen, Fed. Rep. of Germany

[73] Assignee: Fag Kugelfischer Georg Schafer, Fed. Rep. of Germany

[21] Appl. No.: 741,679

[22] Filed: Aug. 7, 1991

[30] Foreign Application Priority Data

Sep. 6, 1990 [EP] European Pat. Off. ........... 90117151

[51] Int. Cl.[5] ............................................. G05D 11/00

[52] U.S. Cl. ...................................... 137/118; 91/446; 60/484

[58] Field of Search .................. 137/101, 118; 60/420, 60/427, 484; 91/446

[56] References Cited

U.S. PATENT DOCUMENTS

| | | | |
|---|---|---|---|
| 2,799,996 | 7/1957 | Van Meter | 137/118 |
| 2,956,577 | 10/1960 | Kirkham | 137/101 |
| 2,971,522 | 2/1961 | Lewis . | |
| 3,323,533 | 6/1967 | Reiner | 137/118 |
| 3,348,563 | 10/1967 | Sidles, Jr. . | |
| 3,455,210 | 7/1969 | Allen | 91/446 |
| 3,674,047 | 7/1972 | Borisovich . | |
| 3,982,469 | 9/1976 | Bianchetta | 60/484 |
| 4,655,250 | 4/1987 | Jackson . | |

FOREIGN PATENT DOCUMENTS

| | | |
|---|---|---|
| 2440498 | 3/1975 | Fed. Rep. of Germany . |
| 3142352 | 9/1982 | Fed. Rep. of Germany . |
| 8702770 | 2/1987 | Fed. Rep. of Germany . |
| 7003358 | 1/1970 | France . |
| 7214480 | 4/1972 | France . |
| 7235067 | 4/1973 | France . |
| 527958 | 10/1940 | United Kingdom . |
| 1101903 | 4/1966 | United Kingdom . |

*Primary Examiner*—A. Michael Chambers

*Attorney, Agent, or Firm*—Ostrolenk, Faber, Gerb & Soffen

[57] ABSTRACT

An automatic shuttle valve having a valve body with a bore defined in it. A piston slide in the bore between first and second and positions and a third intermediate position. The valve distributes hydraulic fluid from a fluid supply through first and second branch conduits to respective first and second fittings leading respectively to first and second selectively operable driven mechanisms. A high pressure fitting at each end of the bore. The piston having respective first and second circular cross section, conical end blocks which are seated in the first seat of the first fitting when the piston is in the first position and the second seat of the second fitting when the piston is in the second position while the cylinder blocks are out of both of the seats when the piston is in the third position. The first and second driven mechanisms include respective first and second valves operable to receive hydraulic fluid from the first fitting or from the second fitting. The passage of fluid to the first or the second driven mechanisms moving the piston respectively toward the first or second positions and passage of fluid through both driven mechanisms moving the piston to the third position.

4 Claims, 2 Drawing Sheets

AUTOMATIC SHUTTLE VALVE

BACKGROUND OF THE INVENTION

The invention concerns an automatic shuttle valve with a piston that slides back and forth in a bore that extends through a housing, distributing hydraulic fluid from a driving mechanism among at least two driven mechanisms in accordance with how much power each is demanding.

Manually activated shuttle valves for distributing hydraulic fluid are known. Published German Application 1 903 792 discloses an automatic shuttle valve for regulating liquid levels in motor vehicles. Two spring loaded seats are connected by a rocker and respond to different demands for power. The seat that does not demand power keeps the hydraulic circulation system from the driving mechanism to the driven mechanism closed until the same power consumption ratio is again attained in both driven mechanisms. The valve has several precision parts, two pistons, an adjustable rocker, and springs, that must be produced separately, making it expensive to manufacture the valve and necessary to keep a wide range of parts in stock.

The applicant is presently distributing metal, or the like material, plate and strip tearing and prying type rescue equipment under the trademark "Lukas". This rescue equipment may be employed to extract passengers from a wrecked vehicle with jammed doors. One driven mechanism makes an incision in the plate material of the body of the wrecked vehicle. If the incision is not wide enough to remove the victims from the vehicle, another driven mechanism expands the opening. There is often not enough time in an emergency situation to uncouple the incision cutter from the driving mechanism and to attach the expander. It would accordingly be desirable to have both tools mounted and ready at the same time. To operate both mechanisms alternately or simultaneously off the same driving mechanism, however, has always required manual switching from the driving mechanism.

OBJECT OF THE INVENTION

The object of the present invention is accordingly to simplify an automatic shuttle valve to the extent that it will be less expensive to manufacture and that fewer parts will need to be kept in stock.

This object is attained with the invention wherein a rounded cross section conically shaped block at each end of the shiftable piston can engage a correspondingly profiled seat in a high pressure fitting and seal off the respective end of the bore. The piston also has a central position at which both fittings are not sealed. Because the driving mechanism communicates with the driven mechanisms through hydraulic fluid-conveyance branches, this ensures that any driven mechanism that is being operated will be supplied with power and that any driven mechanism that is not being operated will be deprived of power due to one or more of the seats respectively opening or closing.

With the automatic shuttle valve of the invention, whatever driven mechanism is in operation will be activated and the requisite hydraulic power will be accordingly supplied. The driven mechanism that is not being employed will be automatically deprived of hydraulic power by the piston.

The branches may accommodate throttles of a known design that regulate the flow and eliminate surges.

Other features and advantages of the present invention will become apparent from the following description of the invention which refers to the accompanying drawings.

BRIEF DESCRIPTION OF THE DRAWING

The two drawings are sections through an automatic shuttle valve in accordance with the invention. FIG. 1 shows the valve at rest, while

DETAILED DESCRIPTION OF THE INVENTION

Figure 1:
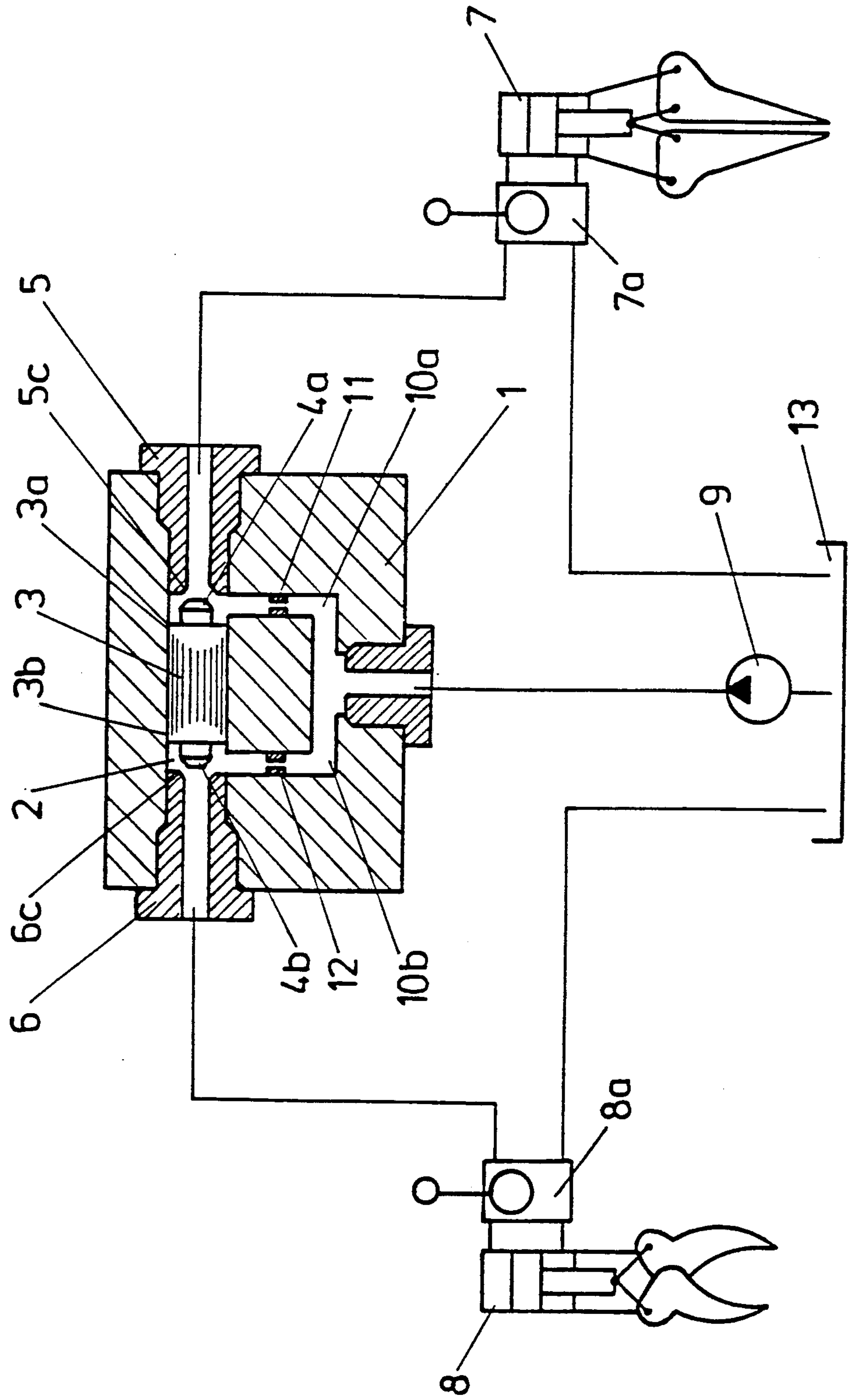

A driving mechanism 9 supplies power to two driven mechanisms 7 and 8 in accordance with how much each driven mechanism demands in a way that will now be described.

Each driven mechanism 7 and 8 is activated by a respective manual diversion valve **7*a* and 8*a*. Driving mechanism 9 obtains hydraulic fluid from a reservoir 13 and supplies it under pressure to one or both of the hydraulic fluid delivery branch conduits 10*a* and 10*b*, which deliver the fluid to the opposite ends of an automatic shuttle valve that distributes the fluid through respective manually operable valves 7*a* and 8*a*, to either of the driven mechanisms 7 and 8 or directly back to reservoir 13**, depending upon the state of the manual valves.

The automatic shuttle valve has a housing 1 and a piston 3 that slides back and forth in a bore 2 extending through the housing 1. A circular cross section, conical end part block **4*a* and 4*b* at each end of the piston 3 can engage a respective seat 5*c* and 6*c* in a respective fitting 5 and 6 and block off communication between that fitting and the associated hydraulic fluid conduit 10*a* and 10*b* leading from the common driving mechanism 9. The conduits 10*a* and 10*b* meet the bore 3 inward of the respective seats 5*c* and 6*c*. The fittings 5 and 6 are inserted in respective ends of the otherwise open ended bore. Each fitting 5 and 6 opens into a respective hydraulic fluid line that leads to one of the driven mechanisms. Specifically, block 4*a* can engage seat 5*c* in fitting 5. The seat 5*c* is shaped, sized and inclined to the cone angle of the block 4*a*. Their engagement blocks off communication of the fitting 5 with the branch conduit 10*a* and with the driven mechanism fluid conduit to the respective driven mechanism 7 or 8. Similarly, block 4*b* can engage seat 6*c* in fitting 6, blocking off communication of the fitting 6 with the branch conduit 10*b* and with the driven mechanism fluid conduit to the respective driven mechanism 7 or 8**.

When neither driven mechanism 7 and 8 is in operation, the manual valves **7*a* and 8*a* that activate the mechanisms are in direct communication with the fluid reservoir 13, and fluid flows from the driving mechanism to the automatic shuttle valve, which distributes fluid equally through each manual valve to the reservoir 13**.

Figure 2:
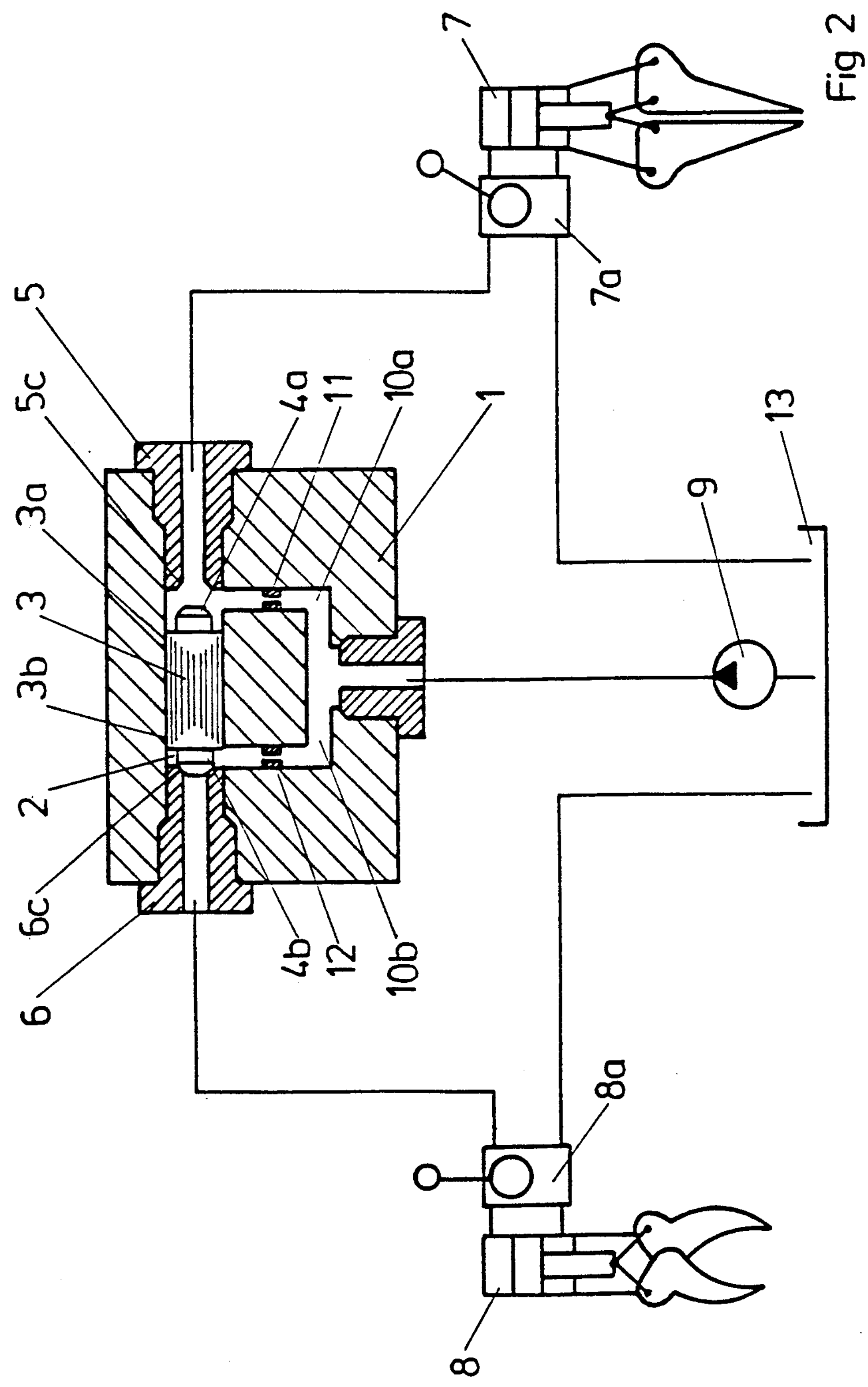
FIG. 2 shows the valve with one driven mechanism in operation.

When only one driven mechanism, mechanism 7 for example, is to be operated, its manual valve **7*a* is thrown to an operating position, and this diverts fluid into the mechanism 7. The fluid forces the piston 3 to the left and into the position illustrated in FIG. 2, with block 4*b* depriving the driven mechanism 8 of fluid and hence of power, but ensuring a full supply of both the fluid and the power to the driven mechanism 7 from the hydraulic power generator 9**.

When both mechanisms 7 and 8 are to be employed, both manual valves are thrown to an operating position, and the piston 3 remains at the neutral mid position illustrated in FIG. 1, with fluid distributed equally to both of the driven mechanisms 7 and 8.

To stabilize the switching function and to suppress any surge occasioned in the hydraulic fluid by driving mechanism 9, known throttles 11 and 12 can be accommodated in the branches 10*a* and 10*b*, respectively.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An automatic shuttle valve for distributing hydraulic fluid to at least two driven mechanisms depending upon their respective power demands, the shuttle valve comprising:

a housing, a bore defined in the housing, and a piston sealably mounted and slidable along the bore among three positions;

a first high pressure fitting in the bore toward the first piston position, a second high-pressure fitting in the bore toward the second piston position, the first fitting being connected with a first driven mechanism and the second fitting being connected with a second driven mechanism for supplying hydraulic fluid through the first fitting to the first driven mechanism and through the second fitting to the second driven mechanism;

the first fitting having a first engageable seat engageable for closing the passage of hydraulic fluid through the first fitting; the second fitting having a second engageable seat engageable for closing the passage of hydraulic fluid through the second fitting;

a first hydraulic fluid delivery conduit from a hydraulic fluid supply to the bore inward of the first seat; a second hydraulic fluid delivery conduit from the hydraulic fluid supply to the bore inward of the second seat;

the piston having opposite first and second ends respectively toward the first and second seats; a first and second block projecting respectively from the first and second ends of the piston, the first and second blocks being respectively circular in cross section through the block and having an outward conically shaped tip extending toward the first and second seats, each of said seats being shaped to seal with the conical shape of its respective block, and the piston first and second positions being so located that with the piston in the first position thereof, the first block is sealingly seated in the first seat and with the piston in the second position thereof, the second block is sealingly seated in the second seat, and the piston third position is between the piston first and second positions where the first and second blocks are out of the respective first and second seats and passage from the first hydraulic fluid delivery conduit through the first fitting and passage from the second hydraulic fluid delivery conduit through the second fitting is permitted, such that hydraulic fluid flow through the first fitting to the first driven mechanism with no fluid flow through the second conduit and the second fitting to the second driven mechanism drives the piston through the bore to the second position with the second block in the second seat and such that hydraulic fluid flow through the second fitting to the second driven mechanism with no fluid flow through the first conduit and the first fitting to the first driven mechanism drives the piston through the bore to the first position with the first block in the first seat and such that with fluid flow through both of the first and the second conduits to the first and second driven mechanisms, the piston being driven to the third position.

2. The shuttle valve of claim 1, further comprising:

a first driven mechanism and a first driven mechanism conduit from the first fitting to the first driven mechanism;

first operating means for operating the first driven mechanism to receive hydraulic fluid from the first driven mechanism conduit and for halting delivery of fluid from the first driven mechanism conduit to the first driven mechanism;

a second driven mechanism and second driven mechanism conduit from the second fitting to the second driven mechanism.

second operating means for operating the second driven mechanism to receive hydraulic fluid from the second driven mechanism conduit and for halting delivery of fluid from the second driven mechanism conduit to the second driven mechanism.

3. The shuttle valve of claim 1, further comprising a common hydraulic fluid supply communicating with both of the first and second hydraulic fluid delivery conduits for supplying fluid thereto.

4. The shuttle valve of claim 1, further comprising a respective throttle in each of the hydraulic fluid delivery conduits for throttling and controlling the flow of fluid therethrough.

* * * * *